(12) United States Patent
Pinsky et al.

(10) Patent No.: US 11,439,123 B2
(45) Date of Patent: Sep. 13, 2022

(54) LIVESTOCK TAG STRAP

(71) Applicant: Afimilk Agricultural Cooperative Ltd., Kibbutz Afikim (IL)

(72) Inventors: Niv Pinsky, Kibutz Afikim (IL); Itamar Cohen, Givat Yoav (IL)

(73) Assignee: AFIMILK AGRICULTURAL COOPERATIVE LTD., Kibbutz Afikim (IL)

( * ) Notice: Subject to any disclaimer, the term of this patent is extended or adjusted under 35 U.S.C. 154(b) by 175 days.

(21) Appl. No.: 16/803,970

(22) Filed: Feb. 27, 2020

(65) Prior Publication Data

US 2021/0267164 A1   Sep. 2, 2021

(51) Int. Cl.
*A01K 11/00*   (2006.01)

(52) U.S. Cl.
CPC .................... *A01K 11/00* (2013.01)

(58) Field of Classification Search
CPC .... A01K 11/00; A01K 35/00; B65D 63/1027; B65D 63/1036; B65D 63/1063; B65D 63/1072; B65D 63/1081; Y10T 24/1498; G09F 3/00; B65C 7/00
See application file for complete search history.

(56) References Cited

U.S. PATENT DOCUMENTS

| | | | | |
|---|---|---|---|---|
| 4,214,349 | A * | 7/1980 | Munch | B65D 63/00 24/16 |
| 4,537,432 | A * | 8/1985 | Meeks | B65D 33/34 292/318 |
| 5,448,846 | A * | 9/1995 | Peterson | G09F 3/005 24/484 |
| 9,775,327 | B2 * | 10/2017 | Downing | G09F 3/00 |
| 2003/0070263 | A1 * | 4/2003 | Mohnke | B65D 63/00 24/16 |
| 2011/0318521 | A1 * | 12/2011 | Waltersdorf | A01K 11/00 428/43 |

FOREIGN PATENT DOCUMENTS

| | | |
|---|---|---|
| CN | 203827851 U | 9/2014 |
| FR | S67114 A | 10/1929 |
| GB | 1002796 A | 8/1965 |
| GB | 1485692 A | 9/1977 |

* cited by examiner

*Primary Examiner* — Joshua J Michener
*Assistant Examiner* — Henry Hooper Mudd
(74) *Attorney, Agent, or Firm* — The Roy Gross Law Firm, LLC; Roy Gross

(57) ABSTRACT

Disclosed is a livestock tag strap comprising an animal-safe element, a human-safe element or both.

17 Claims, 4 Drawing Sheets

LIVESTOCK TAG STRAP

FIELD OF THE INVENTION

The present invention is directed to a livestock tag strap. In particular, the present invention is directed to a livestock tag strap. More particularly, the present invention is directed to a tag strap designed to protect both the tag and the body of the livestock, e.g., the leg of the livestock to which the strap is fastened. Further, the present invention is directed to a tag strap designed to protect the body of the human applying the strap to the livestock.

BACKGROUND OF THE INVENTION

Livestock tag straps are known in the art, wherein those straps may be fastened around the leg, neck, abdomen, or any other appropriate body part of the livestock. Generally, the livestock tag straps are implemented in order to attach various types of tags, used for monitoring the livestock, to the body of the livestock. Such straps are designed to protect the tag, which is relatively costly. One mean by which the tags are protected by the straps are by preparing robust straps that ensure the tag will remain attached to the body of the livestock, even under harsh conditions, e.g., being bumped into, and caught on, various elements found in the vicinity of the livestock. Ensuring the tag remains connected to the livestock ensures that the number of tags lost and destroyed in the livestock habitat is minimal. However, such robust straps are known at times to harm the animal, for instance, when such a robust strap is caught on an element in the vicinity of the livestock, it may be pulled with force, due to the animal's movements, causing it to bruise, or even cut the body part to which it is attached.

Further, a strap must be convenient for a person to handle and attach to the livestock. However, currently used straps are known, at times, to be inconvenient for a person to handle, e.g., holding onto and grasping them in ones' hands, while attaching the straps to the livestock, may be cumbersome and even harmful to the person handling, especially when a large number of straps is applied to the livestock in sequence.

Therefore, there is a need in the art for a strap that will both protect the tag and the livestock to which the tag is fastened to and further, will be convenient for a person to use.

SUMMARY OF EMBODIMENTS OF THE INVENTION

Embodiments of the invention are directed to a livestock tag strap comprising a body element and an animal-safe element, a human-safe element or both an animal-safe element and a human-safe element, wherein the animal-safe element, the human-safe element, or both the animal-safe element and human-safe element, have a lower tensile strength than the body element.

According to some embodiments, the animal-safe element comprises a segment or region that withstands, or is able to withstand, a force of up to about 750 Newtons. According to some embodiments, the animal-safe element comprises a segment or region that withstands, or is able to withstand, a force of up to about 750 Newtons, wherein when a force higher than about 750 Newtons is exerted on the strap, the segment or region in the animal safe segment changes shape. According to some embodiments, the change of shape includes stretching, tearing, breaking, and any combination thereof. According to some embodiments, the animal-safe element comprises a segment or region that has a tensile strength between about 500 and about 750.

According to some embodiments, the human-safe element has a shape size and texture that allows human handling without harm to the human.

According to some embodiments, the livestock tag strap is prepared from one type of polymer or polymer blend. According to some embodiments, the livestock tag strap is prepared from two or more types of polymers or polymer blends.

According to some embodiments, the animal-safe element is prepared from the same polymer(s) and/or polymer blend(s) as the body element.

According to some embodiments, the animal-safe element is prepared from different polymer(s) and/or polymer blend(s) as the body element. According to some embodiments, the animal-safe element is prepared from a polymer(s) and/or polymer blend(s) that has a lower tensile strength than the body element. According to some embodiments, the human-safe element is prepared from different polymer(s) and/or polymer blend(s) as the body element. According to some embodiments, the human-safe element is prepared from a polymer(s) and/or polymer blend(s) that has a lower tensile strength than the body element.

According to some embodiments, the livestock tag strap is a leg strap.

According to some embodiments, the human safe element comprises a tab that has a flat configuration and a rounded-folded configuration. According to some embodiments, the tab is transformed from the flat configuration to the rounded-folded configuration when the livestock tag strap is applied to the livestock.

According to some embodiments, the animal-safe element includes a locking element, which allows the strap to be fastened, though not unfastened without being broken or torn.

Further embodiments of the invention are directed to a system comprising the livestock tag strap of the invention and a spacer. Additional embodiments of the invention are directed to a kit comprising the livestock tag strap of the invention and a spacer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
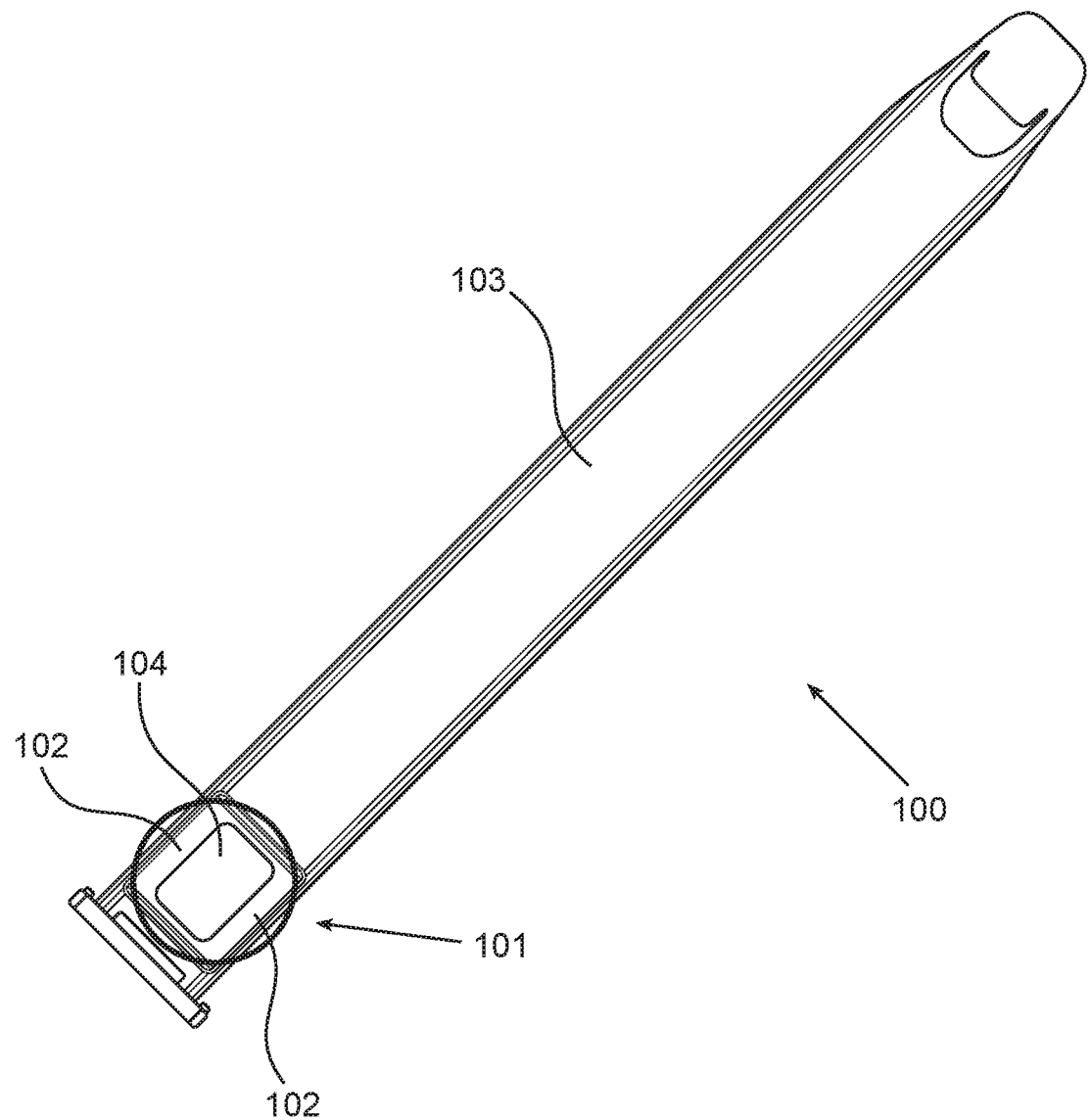
FIG. 1 presents an exemplary strap, particularly presenting an "animal-safe" element.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

It is noted that throughout this document, the terms "livestock tag strap", "tag strap" and "strap" are interchangeable unless specifically mentioned otherwise, or unless a person skilled in the art would have understood otherwise. It is noted that the strap may be a leg tag strap, or any other strap to be used with livestock, e.g., a neck strap, abdomen strap, or even tail strap. The size and shape of the strap will be determined according to the part of the animal to which it is to be attached. According to some embodiments, the strap is a leg tag strap.

It is further noted that throughout this document, the term "about" is intended to cover ±10% of the disclosed value.

Embodiments of the invention are directed to a livestock tag strap that includes an animal-safe element. Embodiments of the invention are directed to a livestock tag strap that includes a human-safe element. Further embodiments of the invention are directed to a livestock tag strap that includes both an animal-safe element and a human-safe element. According to some embodiments, the livestock tag strap comprises an animal-safe element and/or a human-safe element, and a body element, wherein the body element may include all parts of the strap that are not included in the animal-safe element and/or the human-safe element. The animal safe element is designed such that the strap will not significantly change shape, e.g., be stretch, torn or broken, when a force below a threshold force is applied thereto; however, when a force higher than the threshold force is applied to the strap, it will change shape, e.g., will stretch, tear or break, such that the animal is not harmed by the force exerted on the strap.

According to some embodiments, the animal-safe element includes a segment or region that withstands or is able to withstand a force of up to about 750 Newtons, prior to changing shape, e.g., being stretched, torn or broken. According to some embodiments, the animal-safe element includes a segment or region that has a tensile strength between about 500 Newtons and about 750 Newtons. According to some embodiments, the animal-safe element includes a segment or region that has a tensile strength between about 500 Newtons and about 550 Newtons. According to some embodiments, the animal-safe element includes a segment or region that has a tensile strength between about 550 Newtons and about 600 Newtons. According to some embodiments, the animal-safe element includes a segment or region that has a tensile strength between about 600 Newtons and about 650 Newtons. According to some embodiments, the animal-safe element includes a segment or region that has a tensile strength between about 650 Newtons and about 700 Newtons. According to some embodiments, the animal-safe element includes a segment or region that has a tensile strength between about 700 Newtons and about 750 Newtons. According to some embodiments, the animal-safe element includes a segment or region that has a tensile strength of about 750 Newtons.

According to some embodiments, the animal safe element includes a segment or region that withstands, or is able to withstand, a force of up to about 750 Newtons, wherein when a force higher than about 750 Newtons is exerted on the strap, the animal safe element changes shape, e.g., is stretched, torn or broken.

According to some embodiments, the strap is prepared from one type of polymer or polymer blend. According to some embodiments, the strap is prepared from two or more types of polymers or polymer blends. According to some embodiments, the animal-safe element is prepared from (a) different type(s) of polymer or polymer blend than the body element. According to some embodiments, the human-safe element is prepared from (a) different type(s) of polymer or polymer blend than the body element.

The polymers utilized according to this invention may include natural, semisynthetic or synthetic. Any appropriate type of polymer or polymer blend may be used, including, e.g., low density polyethylene, high density polyethylene, polypropylene, polytetrafluoroethylene, polyvinylchloride, polychlorotrifluoroethylene, polyamide, polyimide, polyester, or any combination thereof.

According to some embodiments, the animal-safe element is prepared from a polymer/polymer blend that has a lower tensile strength than the body element. For example, according to some embodiments, while the animal safe element may withstand forces of up to about 750 Newtons before changing shape, e.g., stretching/tearing/breaking, the body element may change shape only at forces above about 800 Newtons, e.g., between about 800 Newtons and about 900 Newtons. According to some embodiments, the animal-safe element is prepared from a polymer/polymer blend that has a lower tensile strength than the body element and/or the human-safe element.

According to some embodiments, the types of polymer/polymer blends of the animal-safe element and the body element and/or the human safe element, if existing, are the same; however, the tensile strength of the animal-safe element is lower than that of the body element and/or the human-safe element, due to the structure of the animal-safe element, in comparison to the other elements. For example, the animal safe element may have a size or shape providing it with a relatively low tensile strength, e.g., a tensile strength of up to about 750 Newton.

The animal-safe element may be designed such that if certain pressure is exerted on the strap, the animal-safe element may be stretched, or even broken/torn, such that the animal is not harmed by the pressure applied to the strap. The pressure applied to the strap may result, for instance, from the strap being caught on a protruding element in the vicinity of the animal and the like.

Reference is now made to FIG. 1 presenting animal tag strap 100, having animal-safe element 101 (encircled in the figure) and body element 103. In the embodiment disclosed in FIG. 1, animal-safe element 101 includes segments 102 and hole (or void or window) 104. In this embodiment, the tensile strength of animal-safe element 101 is lower than that of body element 103 due to hole 104. The thicker and broader segments 102 are, the higher the tensile strength of animal-safe element 101 is. According to some embodiments, the dimensions of hole 104 are between about 20 mm×40 mm to about 30 mm×30 mm. According to some embodiments, the dimensions of hole 104 are about 25.4 mm×36 mm. According to some embodiments, hole 104 has a square or rectangular shape, wherein the corners of the square or rectangle may be rounded.

It is noted that while FIG. 1 discloses two segments 102 and one hole 104, any number of segments and holes may be included in animal-safe element 101. The number of segments and holes, as well as their shapes (thickness, length, breadth, etc.) and the type of polymer/polymer blends from which they are prepared, may define the final tensile strength of the animal-safe element.

Figure 2A:
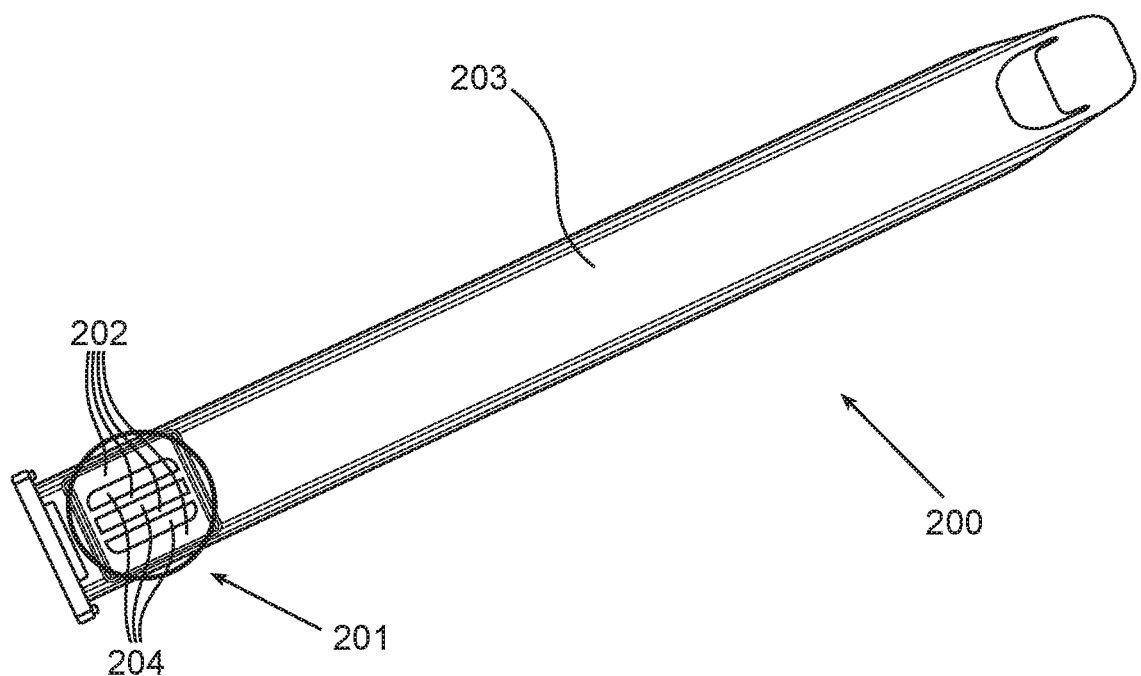
FIGS. 2A and 2B present additional embodiments of an exemplary strap with different animal-safe elements.
Figure 2B:
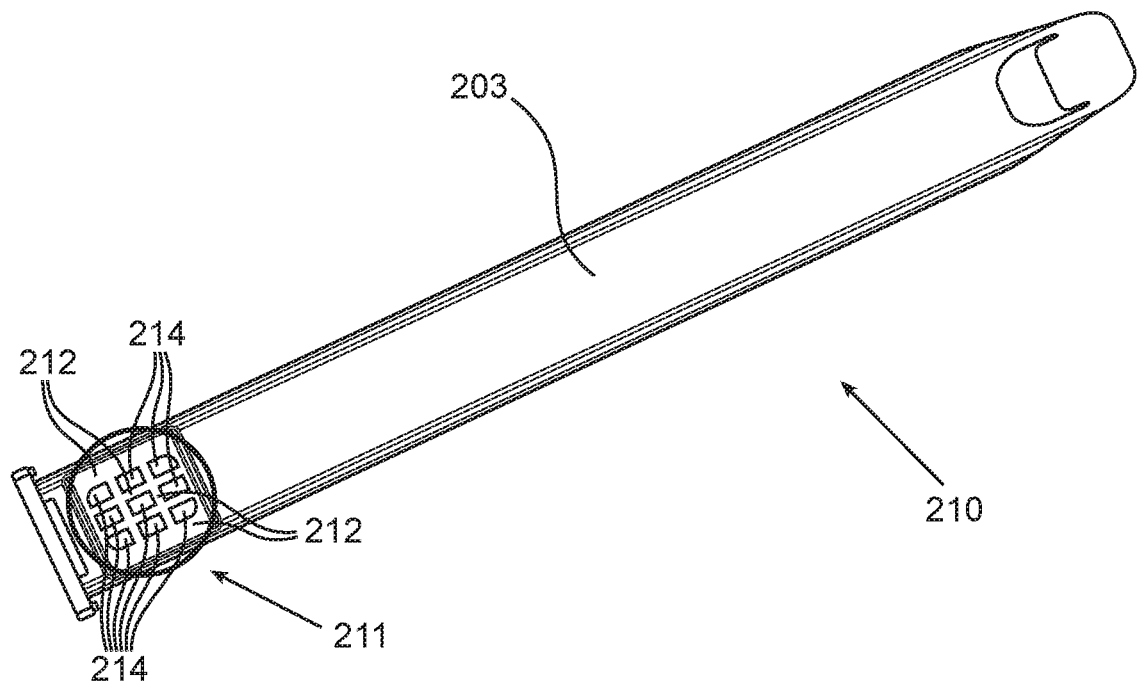

For example, FIGS. 2A and 2B present straps 200 and 210, which include animal-safe elements 201 and 211 (encircled in the figures), respectively. As presented in FIG. 2A, animal-safe element 201 may include four segments 202 and three holes 204. Further, as presented in FIG. 2B, animal-safe element 211 may include a grid-like segment element 212 and, for example, according to the depicted grid, nine hole elements 214.

It is noted that the various segments and holes/voids/windows may be identical to one another, or otherwise, may differ from one another is shape and/or size.

According to some embodiments, the strap includes a human-safe element. Initially, the strap is attached to the animal by a human operator. This human may use bare or gloved hands when applying the strap. The material from which the strap is prepared, as well as the shape thereof, are designed such that the human hands/gloves are not harmed by the application of the strap to the animal. For instance, human-safe element ensures that no bruises, cuts, blisters, or even pain without visual harm, are induced by the application of the strap, even in instances when the animal may move while the strap is being applied and/or when multiple straps are attached in sequence.

Figure 3:
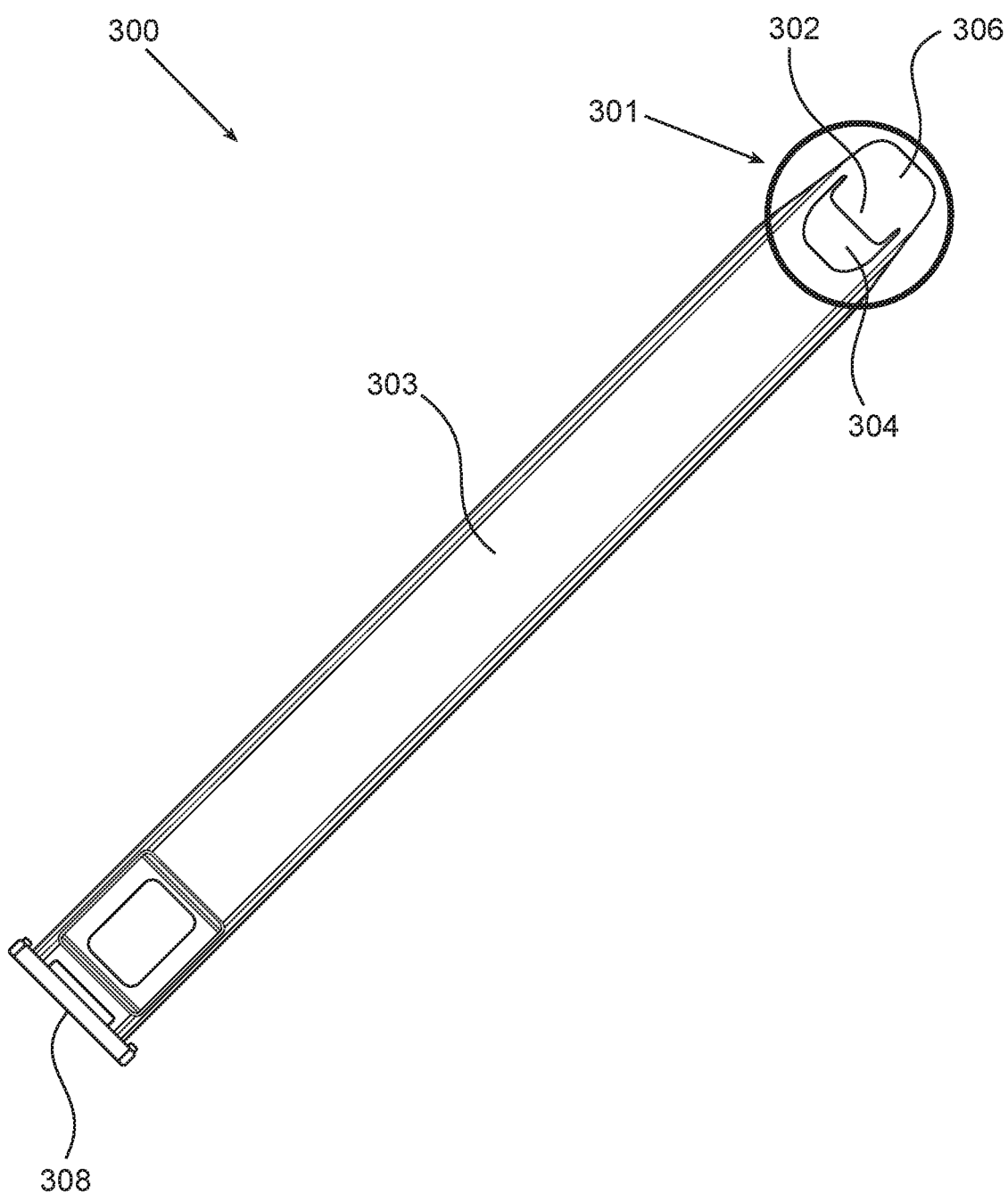
FIG. 3 presents an exemplary strap, particularly presenting a "human-safe" element.

Reference is now made to FIG. 3, presenting strap 300, including human-safe element 301 (encircled in the figure). As presented in FIG. 3, human safe element 301 may include tab 302 and hole (or window or void) 304. When applying strap 300 to an animal, the person (not shown) will insert end 306 through a slit in element 308 (slit not shown). Once end 306 is inserted through element 308, the person will tighten the strap around the animal, e.g., around the animal's leg, by inserting at least one finger into hole 304 and pulling end 306 further through element 308, such that strap body 303 passes further through the slit in element 308, until strap 300 is sufficiently tightened (will not harm or cause pain to the animal, but will remain thereon).

Tab 302 is designed to comfortably fold under the at least one finger inserted into hole 304, such that the finger/glove comes in contact with a rounded form of tab 302, and therefore, is not harmed by fastening the strap.

Figure 4:
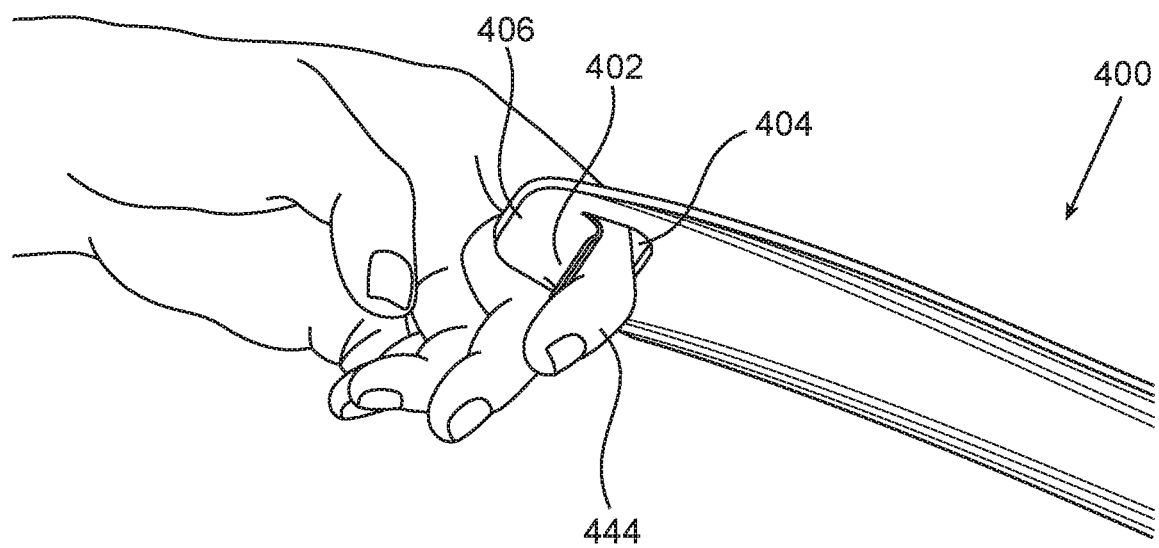
FIG. 4 presents an embodiment of the human-safe element, while being operated by a human finger.

Reference is now made to FIG. 4, presenting index finger 444 inserted into hole 404, pulling on end 406 or strap 400, such that tab 402 assumes a rounded form under index finger 444.

According to further embodiments, human-safe element has a lower tensile strength than the body element, such that even under sharp and quick animal movements, the human will not be harmed with attaching the strap to the animal; rather, the strap may be broken/torn at the human-safe element.

In order for the strap to be sufficiently tight, though not too tight, such that it does not scrape or press the area to which it is attached on the livestock, e.g., the leg, the livestock tag strap detailed herein may be coupled to a spacer, which is inserted between the strap and the animal during application to the animal, and removed thereafter. Thus, embodiments of the invention are directed to a system and/or kit comprising the livestock tag strap and the spacer.

Figure 5:
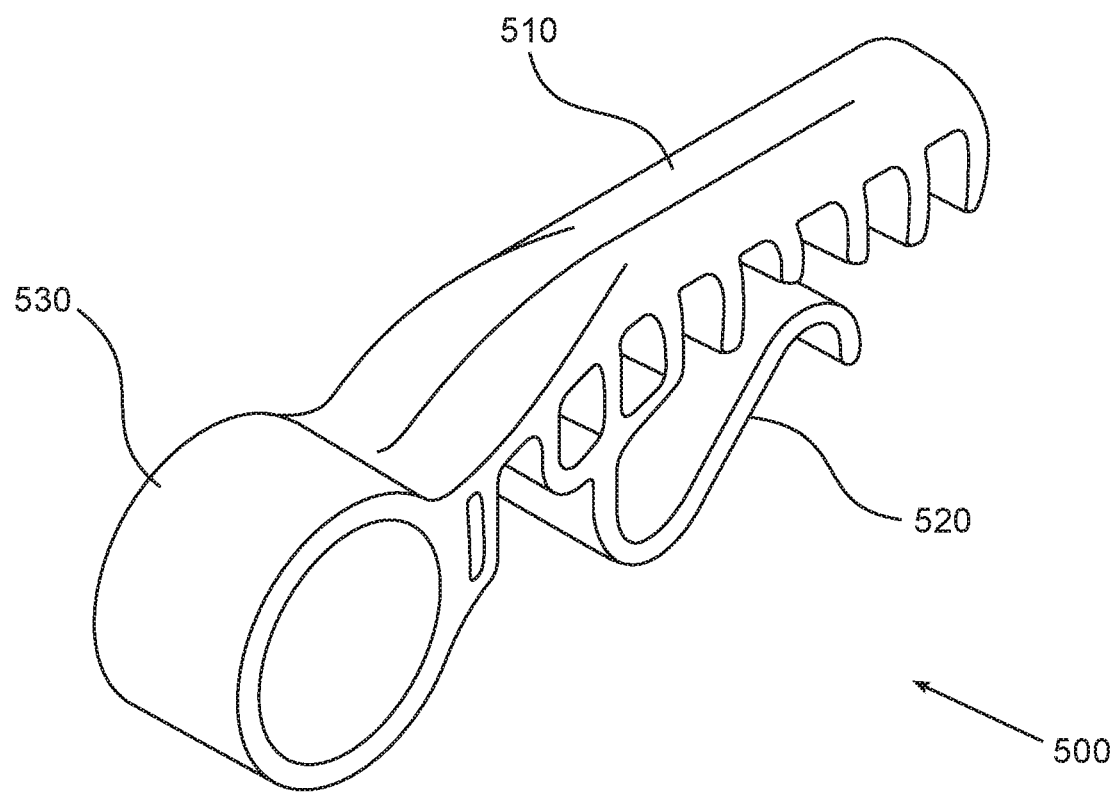
FIG. 5 presents an embodiment of the spacer.

Reference is now made to FIG. 5 presenting spacer 500, which includes spacer element 510, clip element 520 and handle element 530. According to some embodiments, when administering the livestock tag strap to an animal, spacer 500 is held by handle element 530 and placed between the livestock tag strap and the animal, such that spacer element 510 is positioned between the animal, e.g., the animal's leg, and the livestock tag strap and clip element 520 is positioned on the other side of the strap (the strap is positioned between spacer element 510 and clip element 520). Thus, when the livestock tag strap is tightened around the animal, e.g., the animal's leg, spacer element 510 prevents the strap from being fastened too tightly, possibly harming the animal. Once the livestock tag strap is fastened, spacer 500 is removed.

According to some embodiments, spacer element 510 is between about 6 mm to about 20 mm thick. According to some embodiments, spacer element 510 is between about 6 mm to about 8 mm. According to some embodiments, spacer element 510 is between about 8 mm to about 10 mm. According to some embodiments, spacer element 510 is between about 10 mm to about 12 mm. According to some embodiments, spacer element 510 is between about 12 mm to about 14 mm. According to some embodiments, spacer element 510 is between about 14 mm to about 16 mm. According to some embodiments, spacer element 510 is between about 16 mm to about 18 mm. According to some embodiments, spacer element 510 is between about 18 mm to about 20 mm. According to some embodiments, spacer element 510 is between about 10 mm to about 14 mm. According to some embodiments, spacer element 510 is about 10 mm. According to some embodiments, spacer element 510 is about 12 mm. According to some embodiments, spacer element 510 is about 8 mm. According to some embodiments, spacer element 510 is about 14 mm.

It is noted that spacer element 510 may be tapered or have any possible shape, such that the thickness of spacer element 510 may vary along spacer element 510. According to some embodiments, the space remaining between the strap and the animal's body, e.g., the animal's leg, is about 1 mm to about 5 mm greater than the thickness of spacer element 510.

Further, generally the strap may be fastened when applied to the animal by a one-way element, such that, referring to the embodiment in FIG. 3 for sake of illustration, though not limited thereby, end 306 (or any other end) may pass through the slit in element 308 (or any other appropriate element) only in one direction. For instance, element 308 may include a locking element, allowing end 306 to pass through element 308 only for tightening the strap, and not in the other direction, i.e., for releasing the strap, without being torn or broken. Accordingly, such a locking element may act as the animal-safe element detailed herein, or as a second animal-safe element comprised in the strap. According to such an embodiment, the tensile strength of the locking element is lower than that of the strap body element, as detailed herein, due to shape and/or material from which it is prepared, as detailed regarding the animal-safe element described herein.

Unless explicitly stated, the method embodiments described herein are not constrained to a particular order or sequence. Additionally, some of the described method embodiments or elements thereof can occur or be performed simultaneously, at the same point in time, or concurrently.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A livestock tag strap comprising a body element and both an animal-safe element and a human-safe element, wherein the animal-safe element, the human-safe element, or both the animal-safe element and human-safe element, have a lower tensile strength than the body element and wherein said human safe element comprises a tab within a hole, window or void, wherein said tab has a flat configuration and a rounded form and wherein the tab is transformed from the flat configuration to the rounded form configuration when the livestock tag strap is applied to the livestock.

2. The livestock tag strap according to claim 1, wherein the animal-safe element comprises a segment or region that withstands, or is able to withstand, a force of up to about 750 Newtons.

3. The livestock tag strap according to claim 1, wherein the animal-safe element comprises a segment or region that withstands, or is able to withstand, a force of up to about 750 Newtons, wherein when a force higher than about 750 Newtons is exerted on the strap, the segment or region in the animal safe segment changes shape.

4. The livestock tag strap according to claim 3, wherein the change of shape includes stretching, tearing, breaking, and any combination thereof.

5. The livestock tag strap according to claim 1, wherein the animal-safe element comprises a segment or region that has a tensile strength between about 500 and about 750.

6. The livestock tag strap according to claim 1, wherein the human-safe element has a shape size and texture that allows human handling without cutting, bruising, or blistering the human handling the livestock tag strap.

7. The livestock tag strap according to claim 1, wherein the livestock tag strap is prepared from one type of polymer or polymer blend.

8. The livestock tag strap according to claim 1, wherein the livestock tag strap is prepared from two or more types of polymers or polymer blends.

9. The livestock tag strap according to claim 1, wherein the animal-safe element is prepared from the same polymer(s) and/or polymer blend(s) as the body element.

10. The livestock tag strap according to claim 1, wherein the animal-safe element is prepared from different polymer(s) and/or polymer blend(s) as the body element.

11. The livestock tag strap according to claim 10, wherein the animal-safe element is prepared from a polymer(s) and/or polymer blend(s) that has a lower tensile strength than the body element.

12. The livestock tag strap according to claim 1, wherein the human-safe element is prepared from different polymer(s) and/or polymer blend(s) as the body element.

13. The livestock tag strap according to claim 12, wherein the human-safe element is prepared from a polymer(s) and/or polymer blend(s) that has a lower tensile strength than the body element.

14. The livestock tag strap according to claim 1, which is a leg strap.

15. The livestock tag strap according to claim 1, wherein the animal-safe element includes a locking element, which allows the strap to be fastened, though not unfastened without being broken or torn.

16. A system comprising the livestock tag strap according to claim 1 and a spacer.

17. A kit comprising the livestock tag strap according to claim 1 and a spacer.

* * * * *